(12) United States Patent
Chang

(10) Patent No.: US 7,755,856 B2
(45) Date of Patent: Jul. 13, 2010

(54) LENS MODULE AND OPTICAL MODULE INCORPORATING SAME

(75) Inventor: Keng-Ming Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/251,710

(22) Filed: Oct. 15, 2008

(65) Prior Publication Data
US 2009/0225447 A1 Sep. 10, 2009

(30) Foreign Application Priority Data
Mar. 4, 2008 (CN) .................. 2008 1 0300460

(51) Int. Cl.
*G02B 9/00* (2006.01)
(52) U.S. Cl. ...................... 359/797; 359/796
(58) Field of Classification Search .............. 359/796, 359/797, 784, 754, 689
See application file for complete search history.

(56) References Cited

U.S. PATENT DOCUMENTS 6,813,099 B2 * 11/2004 Yamaguchi .............. 359/779
7,570,439 B2 * 8/2009 Bogdan et al. ............. 359/811

* cited by examiner

*Primary Examiner*—Jack Dinh
(74) *Attorney, Agent, or Firm*—Andrew C. Cheng

(57) ABSTRACT

A lens module includes a first lens. The first lens includes a first central round portion and a first peripheral portion. The first peripheral portion has a first radially extending portion surrounding the first central round portion, and a first axially extending portion extending axially from the first radially extending portion. The first radially extending portion comprises a first surface. The first axially extending portion comprises a first cylindrical side surface and a second side surface. The first cylindrical side surface is interconnected between the second side surface and the first surface. The first cylindrical side surface is coaxially aligned with a principal axis of the first central round portion and the second side surface is inclined relative to the principal axis of the central round portion.

10 Claims, 7 Drawing Sheets

LENS MODULE AND OPTICAL MODULE INCORPORATING SAME

CROSS-REFERENCE TO RELATED APPLICATIONS

This application is related to commonly-assigned copending application Ser. No. 12/061,893, entitled "Lens with Collar and Lens Module Using same", and Ser. No. 12/168,785, entitled "Lens Module and Optical Module Incorporating the same". Disclosures of the above-identified application are incorporated herein by reference.

BACKGROUND

1. Technical Field

The invention relates generally to a lens module and an optical module incorporating the lens module.

2. Description of Related Art

Currently, along with the development of electronic devices with multiple functions, image pick-up apparatuses have become widely used in a variety of consumer electronic devices, such as notebook computers, personal digital assistants (PDAs), cellular telephones, etc. In the meantime, there is an increasing demand for improving image quality, which essentially depends on the quality of the lens module of the image pick-up apparatus. That is, a lens module with high image quality is desired.

Referring to FIG. 7, a typical lens module 50 includes a barrel 52, two lenses 54, 56 installed in the barrel 52 and a spacer 58 sandwiched between the two lenses 54 and 56. In addition, the lenses 54 and 56 are assembled along an axis direction of the barrel in order to perform optical functions. However, accumulated errors of concentricity between the lenses 54 and 56 will be produced because principal axes of the lenses 54 and 56 are movable separately and they are spaced apart by the spacer 58. Thus, a camera having the lens module 50 above may produce distorted images.

Therefore, a lens module having an improved concentricity between lenses is desired.

SUMMARY

A lens module includes a first lens. The first lens includes a first central round portion and a first peripheral portion. The first peripheral portion has a first radially extending portion surrounding the first central round portion, and a first axially extending portion extending axially from the first radially extending portion. The first radially extending portion comprises a first surface. The first axially extending portion comprises a first cylindrical side surface and a second side surface. The first cylindrical side surface is interconnected between the second side surface and the first surface. The first cylindrical side surface is coaxially aligned with a principal axis of the first central round portion and the second side surface is inclined relative to the principal axis of the central round portion.

Other advantages and novel features of the present invention will become more apparent from the following detailed description of present embodiment when taken in conjunction with the accompanying drawings.

BRIEF DESCRIPTION OF THE DRAWINGS

The components in the drawing are not necessarily drawn to scale, the emphasis instead being placed upon clearly illustrating the principles of the present invention.

Figure 1:
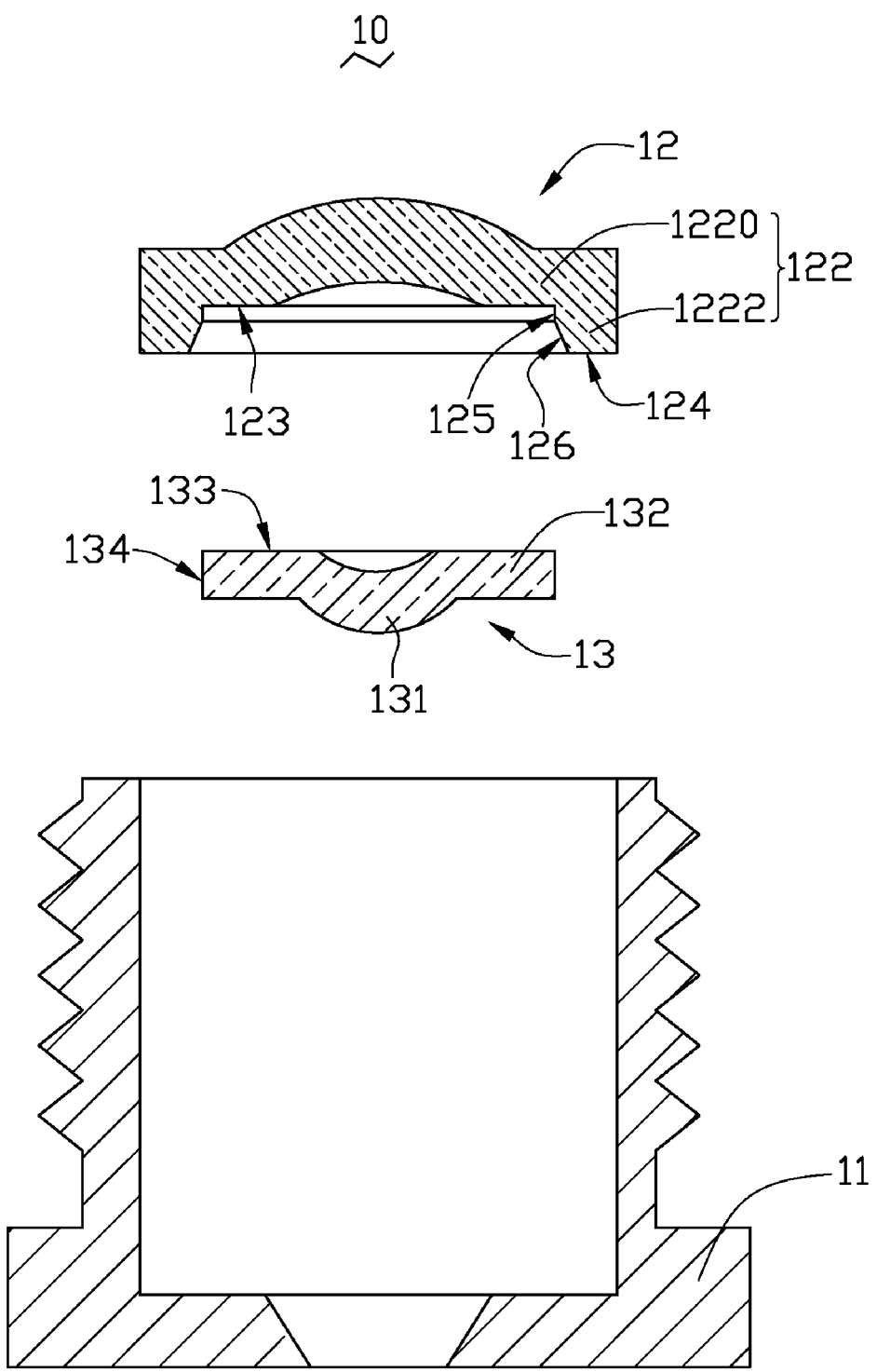
FIG. 1 is a disassembled, cross-sectional view of an optical module according to a first embodiment of present invention.

Corresponding reference characters indicate corresponding parts. The exemplifications set out herein illustrate at least one present embodiment of the present lens module and optical module, in one form, and such exemplifications are not to be construed as limiting the scope of the invention in any manner.

DETAILED DESCRIPTION OF THE EMBODIMENT

Reference will now be made to the drawings to describe embodiments of the present lens module in detail.

Figure 2:
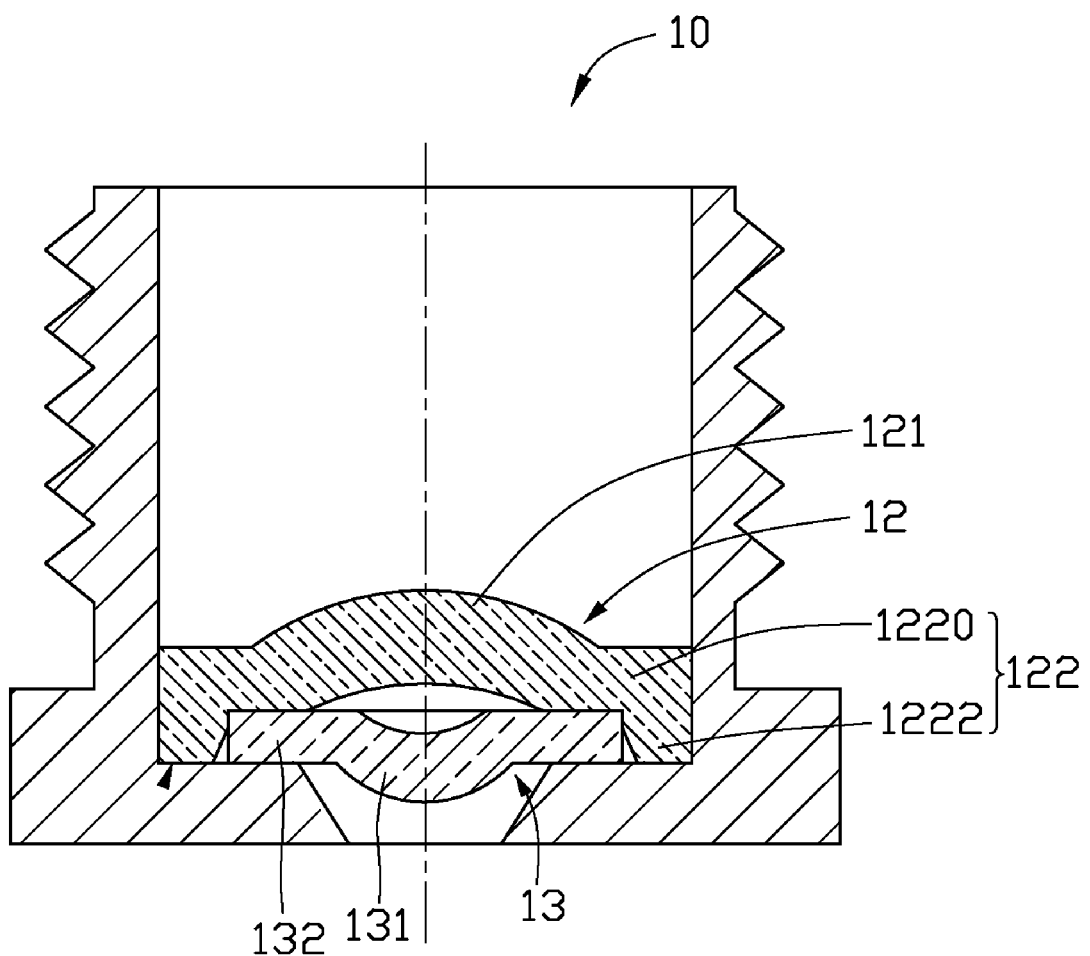
FIG. 2 is an assembled, cross-sectional view of the optical module shown in FIG. 1.

Referring to FIGS. 1 and 2, an optical module 10 of a first embodiment includes a barrel 11 having a first lens 12 and a second lens 13 received therein. The first lens 12 and the second lens 13 can be made of plastic, glass or other optical materials known in the art. In this embodiment, the optical module 10 can be installed in electronic devices, such as notebook computers, personal digital assistants (PDAs), or cellular telephones.

The first lens 12 includes a central round portion 121 and a peripheral stepped structure 122 surrounding the central round portion 121. The central round portion 121 is configured for performing capturing images. The peripheral stepped structure 122 includes a radially extending portion 1220 surrounding the central round portion 121, and an axially extending portion 1222 extending axially from the radially extending portion 1220.

The peripheral stepped structure 122 has a first downward-facing surface 123, a second downward-facing surface 124, a first cylindrical side surface 125 and a second side surface 126 interconnected between the first cylindrical side surface 125 and the second downward-facing surface 124. The first cylindrical side surface 125 is interconnected between the first downward-facing surface 123 and the second side surface 126. The first downward-facing surface 123 belongs to the radially extending portion 1220 and the second downward-facing surface 124 belongs to the axially extending portion 1222. The first cylindrical side surface 125 is substantially perpendicular to the first downward-facing surface 123. The second side surface 126 is a curved surface and is inclined along a direction away from the central round portion 121 for guiding the second lens 13 into the peripheral stepped structure 122.

The second lens 13 includes a central round portion 131 and a radially extending portion 132 surrounding the central round portion 131. The radially extending portion 132 has an upward-facing surface 133 and a cylindrical surface 134 adjacent to the upward-facing surface 133. An external diameter of the portion of the second lens 13 where the cylindrical surface 134 is located is substantially equal to an internal diameter of portion of the first lens 12 where the first cylindrical side surface 125 is located.

In assembly, the second lens 13 is guided into the peripheral stepped structure 122 by the second side surface 126. The second lens 13 is engaged in the peripheral stepped structure 122 of the first lens 12 such that the cylindrical surface 134 of the second lens 13 contacts the first cylindrical side surface 125, and the upward-facing surface 133 of the second lens 13 contacts the first downward-facing surface 123 of the first lens 12. In addition, glue can be used for fixing the lenses 12, 13 more tightly to each other. Then the first and second lenses 12 and 13 are installed in the barrel 11 to form the optical module 10. In this embodiment, because the two lenses 12 and 13 are assembled together, an accumulation of errors of concentricity between the two lenses 12 and 13 can be prevented.

Figure 3:
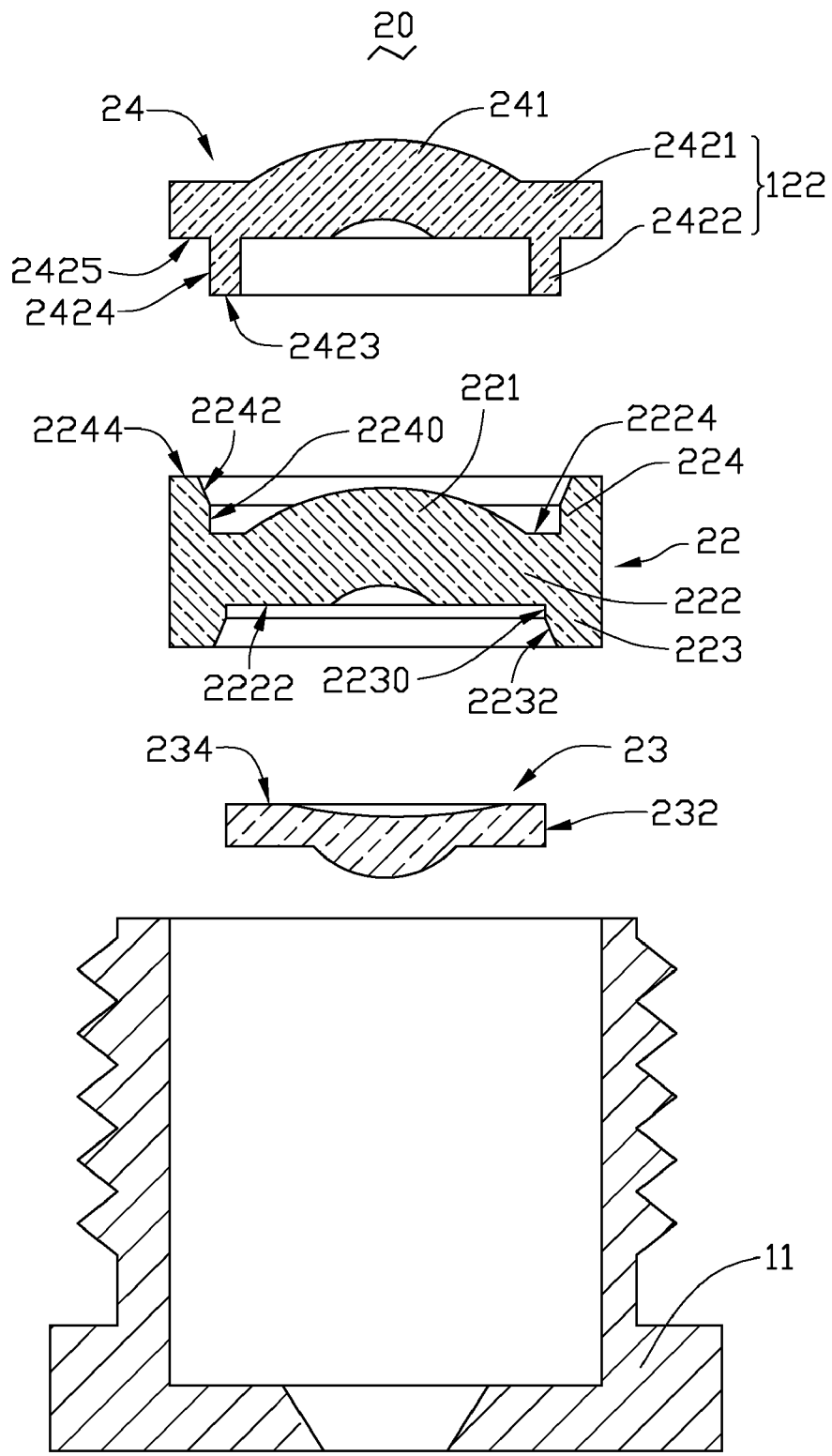
FIG. 3 is a disassembled, cross-sectional view of an optical module according to a second embodiment of present invention.
Figure 4:
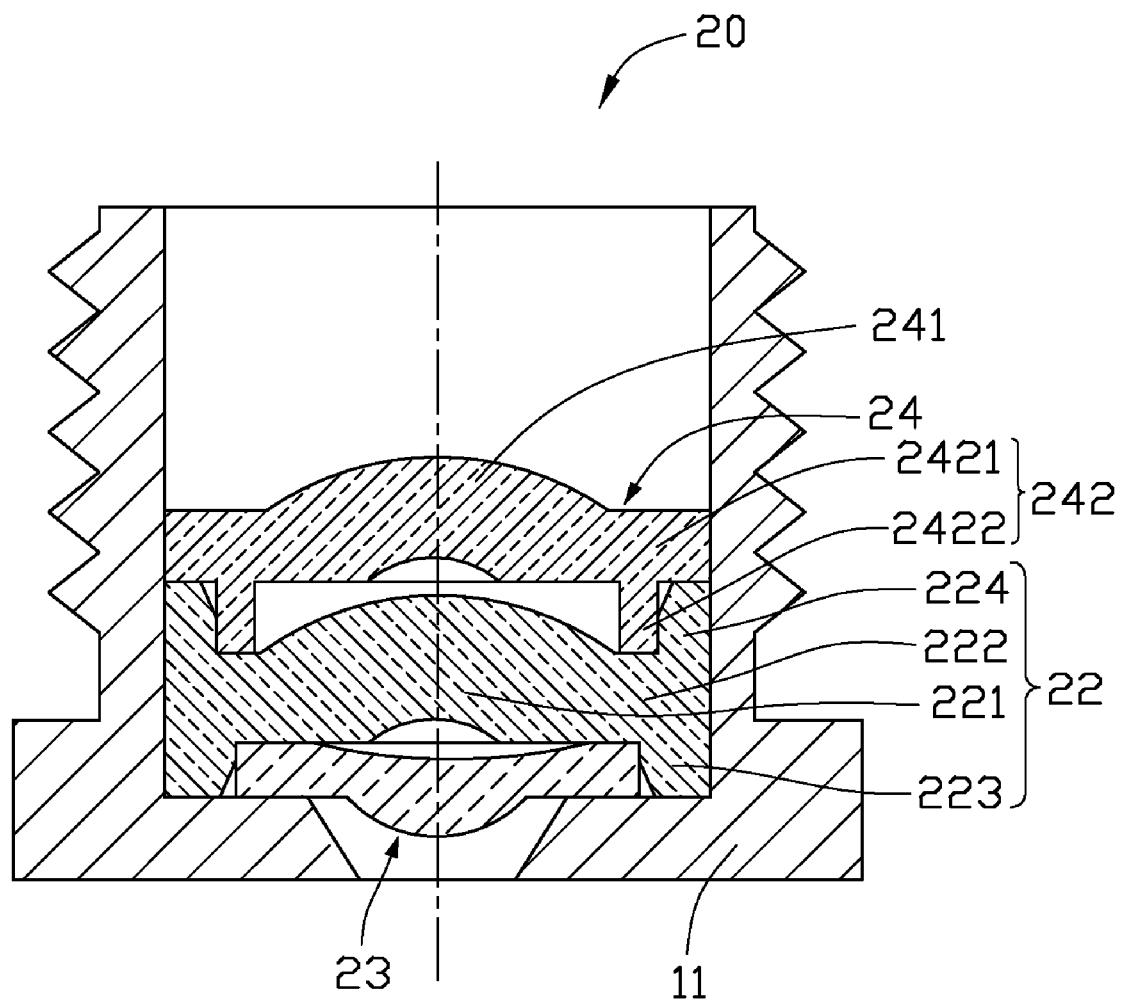
FIG. 4 is an assembled, cross-sectional view of the optical module shown in FIG. 3.

Referring to FIGS. 3 and 4, an optical module 20 of a second embodiment includes a first lens 22, a second lens 23 and a third lens 24. The first lens 22 includes a central round portion 221, a radially extending portion 222, and a first axially extending portion 223, which are identical to the central round portion 121, the radially extending portion 1221, and the axially extending portion 1222 of the first embodiment. The first axially extending portion 223 has a first cylindrical side surface 2230 for contacting the second lens 23 and a second inclined, intermediate side surface 2232 adjacent to the first cylindrical side surface 2230 for guiding the second lens 23. The radially extending portion 222 has a downward-facing surface 2222 adjacent to the first cylindrical side surface 2230.

In this embodiment, the first lens 22 further includes a second axially extending portion 224 extending axially from the radially extending portion 222 of the first lens 22. An extending direction of the second axially extending portion 224 from the radially extending portion 222 is opposite to that of the first axially extending portion 223. The second axially extending portion 224 is similar to the axially extending portion 1222 of the first embodiment. The second axially extending portion 224 has a third intermediate side surface 2240, a fourth intermediate side surface 2242 and a first upward-facing surface 2244. The radially extending portion 222 has a second upward-facing surface 2224. The third intermediate side surface 2240 is interconnected between the fourth intermediate side surface 2242 and the second upward-facing surface 2224. The fourth intermediate side surface 2242 is adjacent to the first upward-facing surface 2244. The fourth intermediate side surface 2242 is identical to the second side surface 2232 for guiding the third lens 24.

The second lens 23 is identical to the second lens 13 of the first embodiment. An external diameter of the portion of the second lens 23 where a cylindrical surface 232 of the second lens 23 is located is substantially equal to an internal diameter of the portion of the first lens 22 where the first cylindrical side surface 2230 is located. An upward-facing surface 234 of the second lens 23 adjacent to the cylindrical surface 232 contacts the downward-facing surface 2222, and the cylindrical surface 232 of the second lens 23 contacts the first cylindrical side surface 2230 of the first lens 22. In addition, glue can be used for fixing the lenses 22, 23 together more tightly.

The third lens 24 includes a central round portion 241 and a peripheral stepped structure 242. The peripheral stepped structure 242 includes a second radially extending portion 2421 surrounding the central round portion 241 and a third axially extending portion 2422 extending axially from the second radially extending portion 2421. The third axially extending portion 2422 has a third downward-facing surface 2423 and a cylindrical surface 2424 adjacent to the third downward-facing surface 2423. The second radially extending portion 2421 has a fourth downward-facing surface 2425 adjacent to the cylindrical surface 2424. An external diameter of portion of the third lens 24 where the cylindrical surface 2424 of the third lens 24 located is substantially equal to an internal diameter of portion of the first lens 22 where the third intermediate side surface 2240 located.

In assembly, the third axially extending portion 2422 is guided by the fourth intermediate side surface 2242 into a space defined by the third intermediate side surface 2240. The third downward-facing surface 2423 of the third lens 24 contacts the second upward-facing surface 2224 of the first lens 22. The third intermediate side surface 2240 of the first lens 22 contacts the cylindrical surface 2424 of the third lens 24. In this embodiment, a thickness of the second axially extending portion 224 is substantially equal to that of the third axially extending portion 2422, so that the first upward-facing surface 2244 of the first lens 22 contacts the fourth down-facing surface 2425. In addition, glue can be used for fixing the lenses 22, 24 together more tightly. Then, the first, second and third lenses 22, 23 and 24 are installed in the barrel 11 to form the optical module 20. In this embodiment, because the three lenses 22, 23 and 24 are assembled together, an accumulation of errors of concentricity between the two lenses 22 and 23, and the lens 22 and 24 can be prevented.

Figure 5:
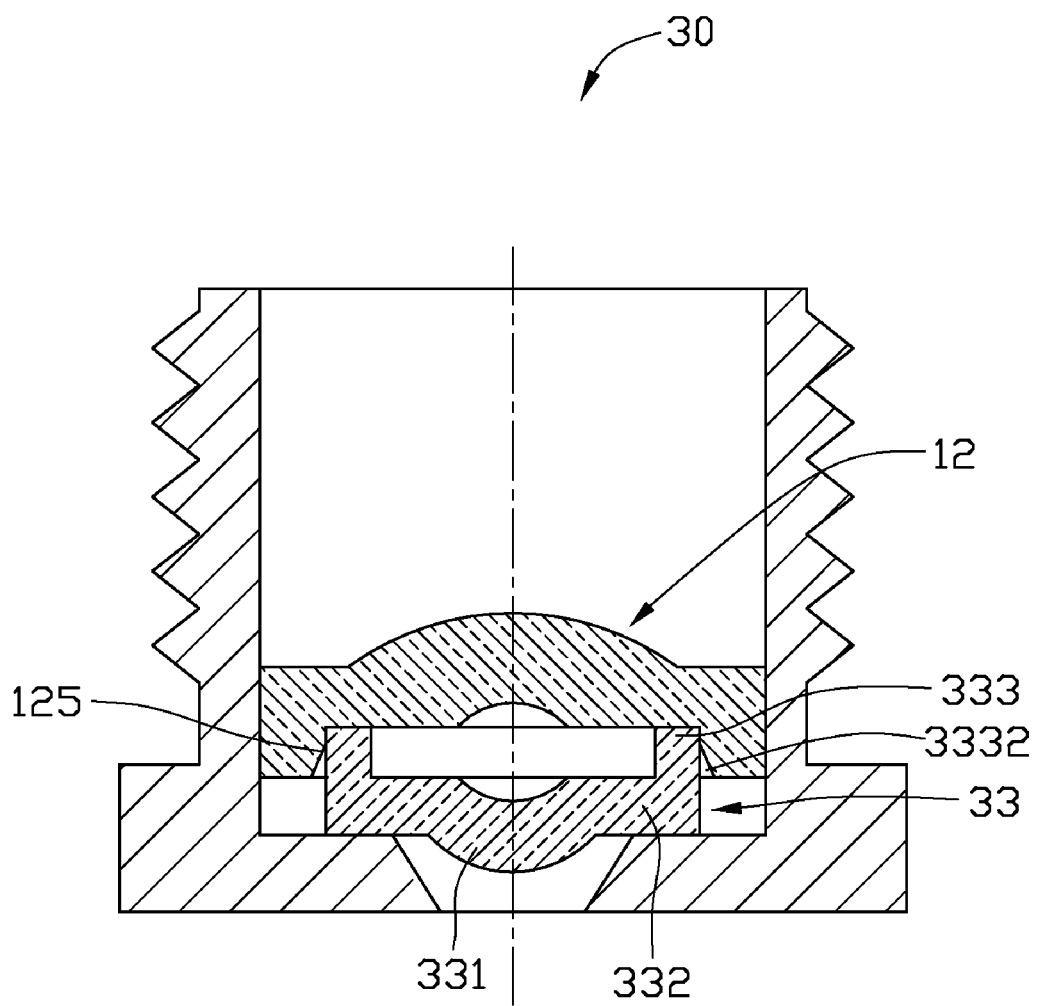
FIG. 5 is a schematic, cross-sectional view of an optical module according to a third embodiment of present invention.

Referring to FIG. 5, an optical module 30 of a third embodiment is illustrated. The optical module 30 is similar to the optical module 10 of the first embodiment, except that the optical module 30 includes a second lens 33 different from the second lens 13 of the first embodiment. The second lens 33 includes a central round portion 331, a radially extending portion 332 and an axially extending portion 333 extending axially from the radially extending portion 332. An external diameter of the portion of the second lens 33 where a cylindrical surface 3332 is located is substantially equal to an internal diameter of portion of the first lens 12 where the first cylindrical side surface 125 of the first lens 12 is located. The cylindrical surface 3332 of the second lens 33 contacts the first cylindrical side surface 125 of the first lens 12.

Figure 6:
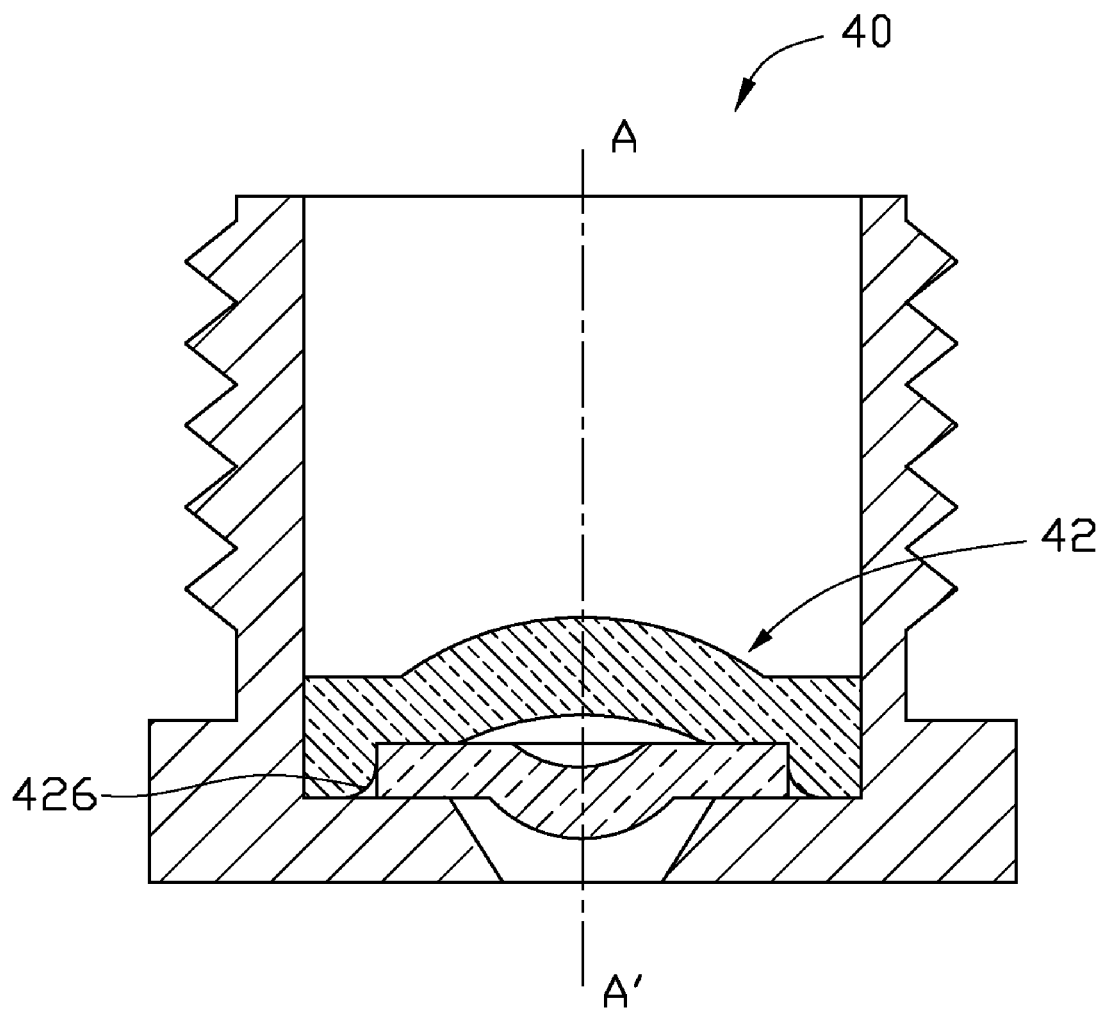
FIG. 6 is a schematic, cross-sectional view of an optical module according to a fourth embodiment of present invention.
Figure 7:
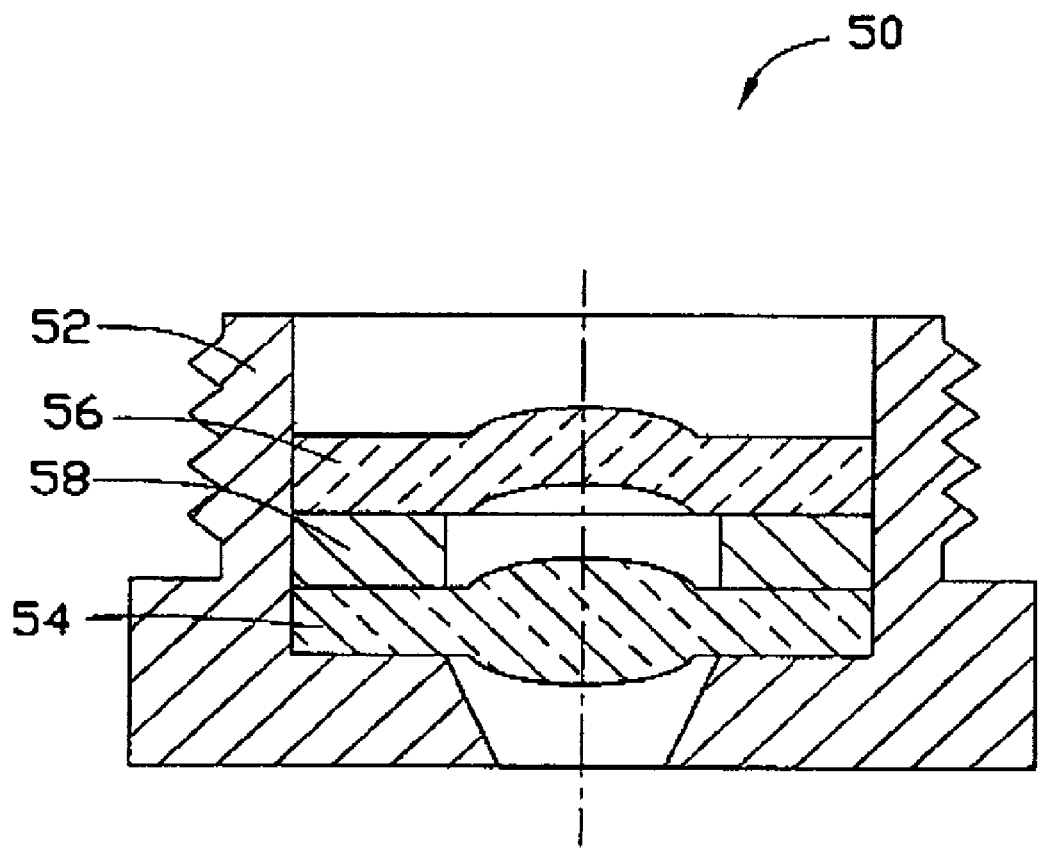
FIG. 7 is a schematic, cross-sectional view of a general optical module.

Referring to FIG. 6, an optical module 40 of a fourth embodiment is illustrated. The optical module 40 is similar to the optical module 10, except that a second side surface 426 of a first lens 42 is a curved surface. A cross section of the second side surface 426 taken along a direction parallel with a principal axis A-A' of the first lens 42 is arc-shaped and the middle portion of the second side surface 426 is curved towards the principal axis A-A' of the first lens 42.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A lens module comprising:
 a first lens comprising a first central round portion and a peripheral portion, the peripheral portion having a first radially extending portion surrounding the first central round portion, a first axially extending portion extending axially from the first radially extending portion in a first direction, and a second axially extending portion extending axially from the first radially extending portion in a second direction opposite to the first direction, the first radially extending portion comprising a first surface, the first axially extending portion comprising a cylindrical first inner side surface and a second inner side surface, the cylindrical first inner side surface being interconnected between the second inner side surface and the first surface, the cylindrical first inner side surface being coaxially aligned with a principal axis of the first central round portion, and the second inner side surface being inclined relative to the principal axis of the first central round portion, the first radially extending portion further comprising a second surface facing away from the first surface, the second axially extending portion comprising a cylindrical third inner side surface and a fourth inner side surface, the cylindrical third inner side surface being interconnected between the fourth inner side surface and the second surface, the cylindrical third inner side surface being coaxially aligned with the principal axis of the first central round portion, and the fourth inner side surface being inclined relative to the principal axis of the first central round portion;

a second lens comprising a second central round portion and a second radially extending portion surrounding the second central round portion, the second radially extending portion a cylindrical first outer side surface coaxially aligned with a principal axis of the second central round portion, the second lens being engaged in the first lens in a manner that the cylindrical first outer side surface contacts the cylindrical first inner side surface of the first lens; and a third lens comprising a third central round portion, a third radially extending portion surrounding the third central round portion, and a third axially extending portion extending axially from the third radially extending portion, the third axially extending portion having a cylindrical second outer side surface, the third lens being engaged in the first lens in a manner that the cylindrical second outer side surface of the third lens contacts the cylindrical third inner side surface of the first lens, the third radially extending portion having an outer diameter substantially equal to an outer diameter of the second axially extending portion.

2. The lens module of claim 1, wherein a cross section of the second inner side surface taken along a direction parallel with the principal axis of the first central round portion is arc-shaped, and the middle portion of the second inner side surface is curved towards the principal axis of the first central round portion.

3. The lens module of claim 1, wherein the third axially extending portion has a third surface adjacent to the cylindrical second outer side surface, the third lens being engaged in the first lens in a manner that the third surface contacts the second surface.

4. The lens module of claim 3, wherein the second surface of the second axially extending portion of the first lens is annular, and the third surface of the second axially extending portion of the third lens is annular.

5. The lens module of claim 3, wherein the second axially extending portion of the first lens further comprises a fourth surface at an end thereof adjacent to an outer periphery of the second axially extending portion, and the third radially extending portion of the third lens comprises a fifth surface adjacent to the cylindrical second outer side surface, the third lens being engaged in the first lens in a manner that the fifth surface contacts the fourth surface.

6. The lens module of claim 5, wherein the fourth surface of the second axially extending portion of the first lens is annular, and the fifth surface of the third radially extending portion of the third lens is annular.

7. The lens module of claim 1, wherein an outer diameter of the third lens is that of the third radially extending portion, an outer diameter of the first lens is the same as the outer diameter of the second axially extending portion, and an outer diameter of the second lens is an outer diameter of the cylindrical first outer side surface.

8. An optical module comprising:

a first lens comprising a first central round portion and a peripheral portion, the peripheral portion having a first radially extending portion surrounding the first central round portion, a first axially extending portion extending axially from the first radially extending portion in a first direction, and a second axially extending portion extending axially from the first radially extending portion in a second direction opposite to the first direction, the first radially extending portion comprising a first surface, the first axially extending portion comprising a cylindrical first inner side surface and a second inner side surface, the cylindrical first inner side surface being interconnected between the second inner side surface and the first surface, the cylindrical first inner side surface being coaxially aligned with a principal axis of the first central round portion, and the second inner side surface being inclined relative to the principal axis of the first central round portion, the first radially extending portion further comprising a second surface facing away from the first surface, the second axially extending portion comprising a cylindrical third inner side surface and a fourth inner side surface, the cylindrical third inner side surface being interconnected between the fourth inner side surface and the second surface, the cylindrical third inner side surface being coaxially aligned with the principal axis of the first central round portion, and the fourth inner side surface being inclined relative to the principal axis of the first central round portion;

a second lens comprising a second central round portion and a second radially extending portion surrounding the second central round portion, the second radially extending portion having a cylindrical first outer side surface coaxially aligned with a principal axis of the second central round portion, the second lens being engaged in the first lens in a manner that the cylindrical first outer side surface contacts the cylindrical first inner side surface of the first lens; and a third lens comprising a third central round portion, a third radially extending portion surrounding the third central round portion, and a third axially extending portion extending axially from the third radially extending portion, the third axially extending portion having a cylindrical second outer side surface, the third lens being engaged in the first lens in a manner that the cylindrical second outer side surface of the third lens contacts the cylindrical third inner side surface of the first lens, the third radially extending portion having an outer diameter substantially equal to an outer diameter of the second axially extending portion; and a barrel, the first, second and third lenses being received in the barrel.

9. The optical module of claim 8, wherein a cross section of the second inner side surface taken along a direction parallel with the principal axis of the first central round portion is arc-shaped, and the middle portion of the second inner side surface is curved towards the principal axis of the first central round portion.

10. The optical module of claim 8, wherein the third radially extending portion has a third surface adjacent to the cylindrical second outer side surface, the third lens being engaged in the first lens in a manner that the third surface contacts the second surface.

* * * * *